Oct. 21, 1969   A. F. MAYR   3,473,433
BOLTS

Filed Nov. 25, 1966   3 Sheets-Sheet 1

Oct. 21, 1969  A. F. MAYR  3,473,433

BOLTS

Filed Nov. 25, 1966  3 Sheets-Sheet 2

Oct. 21, 1969  A. F. MAYR  3,473,433
BOLTS

Filed Nov. 25, 1966  3 Sheets-Sheet 3

United States Patent Office 3,473,433
Patented Oct. 21, 1969

3,473,433
BOLTS
Alfred F. Mayr, 6401 Inzing, Tyrol, Austria
Filed Nov. 25, 1966, Ser. No. 596,871
Claims priority, application Austria, Nov. 30, 1965,
A 10,744/65
Int. Cl. F16b 15/00, 15/06, 15/02
U.S. Cl. 85—10                                    8 Claims

ABSTRACT OF THE DISCLOSURE

A bolt having a head to be fitted on a shaft which is embedded in a support, to firmly hold clips, conduits, wires, tubes or the like between said head and the support. The bolt is provided with longitudinal and transverse grooves and the head is provided with corresponding internal projections engaging in said grooves such that the head can be irreplaceably secured to the shaft or detachably mounted thereon.

---

Figure 1:
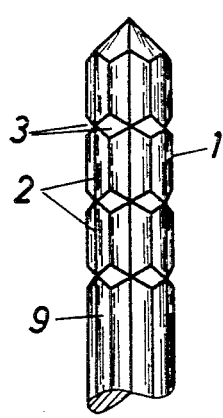

The invention is directed to a bolt which can be embedded by propulsion or the like in masonry, concrete, peg board, wood, polymeric plastic material or the like for securing clips, conduits, pipes, sheets, plates or other building elements and web pieces.

In the fitting of pipes, conduits and the like to masonry and concrete walls, steel bolts are preferably used for anchorage, which either are driven into the wall mechanically by means of percussion apparatus or are propelled in by an explosive force from a bolt propulsion apparatus. A number of different tools are known both for the "percussion" and "shot" fitting.

For fixing, damp course clips, conduits or the like on the fitted bolts in all known proposals a slotted nut which can be screwed onto a thread on the bolt is used. For special purposes, clips are used which themselves have a thread so that for securing them on the bolt a special nut is unnecessary.

It is readily seen that such bolts are costly in manufacture and the manner of fixing requires a relatively long time, wherein indeed fitted bolts often have to be changed since their threads are damaged in the fitting process, so that they are quite unfit for the screwing on nuts. In contrast to the rapid insertion of the bolts in masonry, the fixing of the conduits takes a relatively long time and accordingly increases the cost.

These disadvantages are avoided in a known bolt fixable by percussion or explosive force, the head of which bolt has longitudinal grooves and indentations running transversely of the grooves. In the interior of a cap, which can be fitted on the bolt head, and having similar longitudinal grooves, there are provided bosses or beads transversely disposed in relation to the grooves and corresponding to the indentations of the bolt head, so that the cap fitted on by percussion rests with its bosses or beads in the indentations of the bolt head and is secured on the bolt head. If the shank of such a bolt is smooth then its retention in the wall is relatively slight.

The invention therefore proposes also to provide on the shank carrying the bolt head axially extending grooves, wherein in a preferred embodiment there are also indentations running transversely to the grooves, the annular surfaces of which form with one another a right angle or acute angle, so that a specially good retention in the masonry or the like is given. In the latter case, the apex of the angle is inclined to the axis of the bolt shank and opposed to the direction of withdrawal so that the indentations act as barbs and in addition guarantee that such a bolt can only be withdrawn from its seat against great resistance. The apex of the angle of the indentations can however, if desired, be inclined in the direction of insertion.

In one embodiment which permits a special multi-lateral use, the shank of the bolt is formed as a mirror-image to the bolt head, wherein the plane of symmetry runs radially through the center of the bolt. Such a bolt has practically no difference as between shank and head. It can accordingly be inserted in a wall, masonry or the like from either end, the cap to be secured thereon being fitted on the free end. This makes possible a substantial simplification in operation since one does not first have to ensure that the bolt is correctly inserted.

If such a shank is so formed that the indentations in the bolt shank show any flat grooves, the cap fitted on the portion freely projecting from the wall can be withdrawn again as desired since the indentations do not act as barbs. The retention of the portion set in the wall is in this case very slight.

The invention is described in several embodiments with reference to the drawing, which however only shows by way of example construction in accordance with the inventive concept, the invention not being limited thereto.

Figure 2:
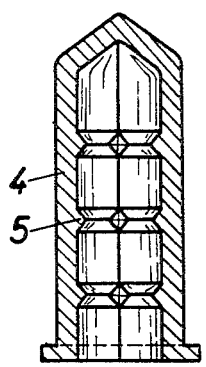
Figure 3:
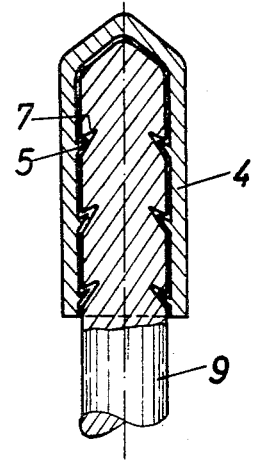
Figure 4:
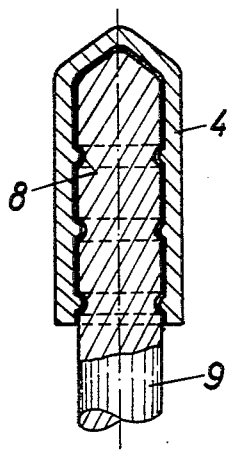
Figure 5:
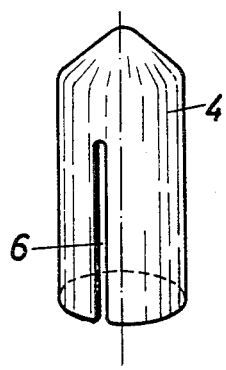
Figure 6:
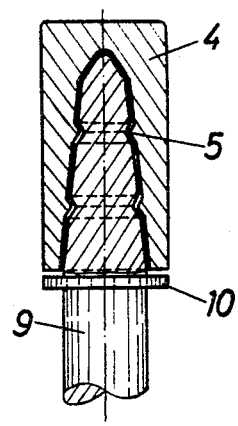
Figure 7:
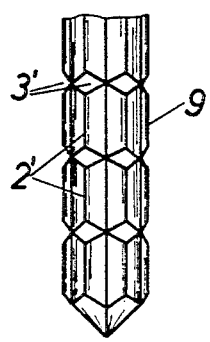
Figure 8:
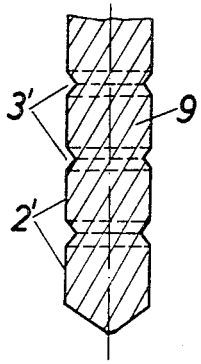
Figure 9:
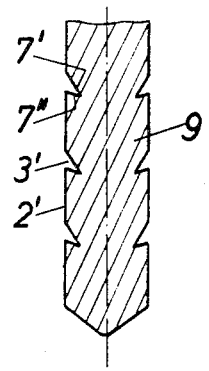
Figure 10:
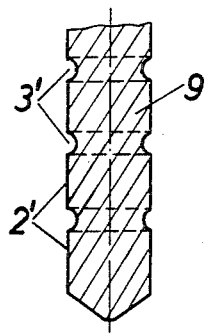
Figure 11:
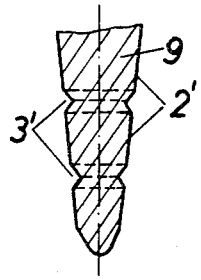
Figure 12:
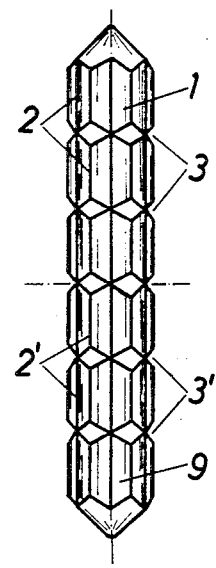
Figure 13:
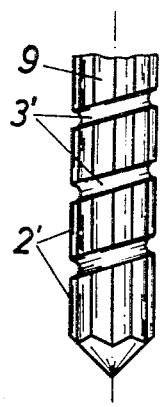
Figure 14:
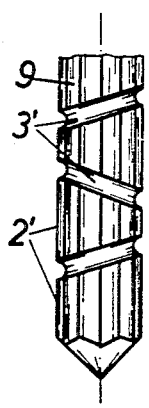
Figure 15:
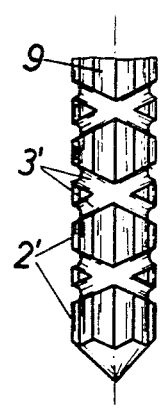
Figure 16:
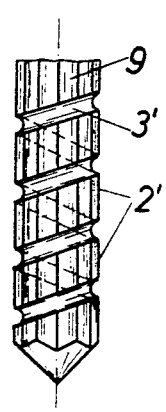
Figure 17:
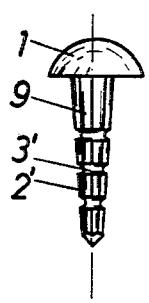
Figure 18:
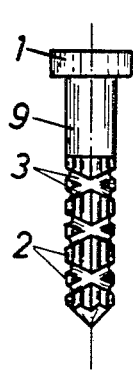
Figure 19:
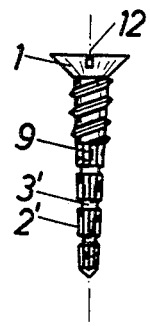
Figure 20:
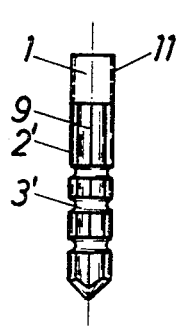

FIGURE 1 is an illustration of a bolt head,
FIGURE 2 shows a section of a cap which can be applied to a bolt head according to FIGURE 1,
FIGURES 3 and 4 show possible indentations of cap and bolt head, wherein that in FIGURE 3 illustrates an unreleasable connection and that in FIGURE 4 a releasable combination.
FIGURE 5 illustrates a cap with a slot,
FIGURE 6 shows in section a particular embodiment of bolt head with fitted cap,
FIGURE 7 illustrates the shank of a grooved bolt in accordance with the invention with transversely extending indentations,
FIGURES 8 to 10 show longitudinal sections of various possible indentations on the shaft,
FIGURE 11 shows a longitudinal section of a conical construction of a shank end,
FIGURE 12 illustrates a bolt in which shank and head are provided with like grooves and indentations,
FIGURES 13 to 15 illustrate various possible arrangements of annular indentations on the shank,
FIGURE 16 illustrates screw-shaped indentations,
FIGURES 17 to 19 illustrate various constructions of head on a grooved shank in accordance with the invention and
FIGURE 20 illustrates a head end on a screw threaded shank for fitting of a nut.

FIGS. 1–6 show a bolt consisting of a shank 9 and a head 1 which has longitudinal grooves 2 which can be continuous or interrupted. Because of these grooves, such a bolt not only penetrates easily into masonry but it also has a relatively great stability so that for the like purpose a bolt of substantially cheaper material can be used. Indentations 3 transverse to the grooves 2 are formed in the head 1 so that a cross-grooved head results, onto which the correspondingly constructed cap 4 is secured.

The interior of the socket shaped cap 4 not only has grooves at equal spacing as in the bolt 9, so that on pushing the cap 4 onto the bolt head 1, the bosses in the socket of the cap 4 engage in the recesses of the channels 2 of the bolt head, but bosses or beads 5 are provided in the cap socket which can engage in the indentations 3 of the bolt head 1.

In driving the cap 4 onto the bolt head 1, these bosses 5 are pushed over the grooves 2 of the bolt head 1. If the cap 4 is of metal, it preferably has a slot 6 as shown in FIGURE 5, so that it is sufficiently resilient for this purpose. If the cap 4 is made of polymeric plastic material, such a slot can be omitted since the plastic material has a sufficiently large elasticity for the desired purpose.

The connection between cap 4 and bolt head 1 can be made both releasable and unreleasable. In the latter case, indentations are provided in the bolt head (see FIGURE 3) such that their upper annular surfaces 7 form with the lower annular surfaces an upwardly directed acute angle. A corresponding construction of the cap 4 then acts so that this cap when driven onto the bolt head 1 is securely fitted and cannot be withdrawn since the bosses 5 of the cap 4 act as barbs.

In contrast thereto an embodiment is shown in FIGURE 4 wherein the cap 4 can be released from the bolt head as desired. Here the indentations 8 are kept flat and have rounded edges so that those parts of the cap 4, which engage in the indentations, are removed (by a pull opposed to the direction of insertion) from the indentations 3 and released from the bolt head 1.

FIGURE 6 shows a truncated cone form of bolt head. The cap 4 is adapted correspondingly to this shape. The feasibility of readily driving such a cap onto the bolt head can be seen in this embodiment. In this example, a disc 10 is provided between the bolt shank and the bolt head which makes it possible to drive the bolt flush up to this disc 10 and accordingly to secure without further attention an exactly equal projection of individual bolt heads.

Obviously the cap may be constructed corresponding to the manner of use at the time, for example, as a pipe clip or as a fixing nut and such cap can have at its head, indentations for the reception of conduits, wires or the like.

On the shaft 9 of the bolt 1 as on the head, FIG. 7 shows grooves 2' and transverse indentations 3' arranged so that the bolt 1 has continuous grooves and indentations. The indentations can as shown in FIGURE 8 have a shape such that their surface in section form with one another a right angle. In this embodiment the bolt can if necessary be relatively easily withdrawn again from their seatings.

In an embodiment according to FIGURE 9 in which the bolts 1 will remain permanently seated in the wall, the surfaces 7', 7" of the indentations 3' form an acute angle directed away from the apex of the bolt, so that the indentations 3' act as barbs and provide a relatively high resistance to withdrawal. It is clear that the construction of a bolt according to FIGURES 8 or 9 is selected according to the anticipated loading.

FIGURE 10 shows a bolt shank 9 in which the indentations 3' are formed, not through angularly converging surfaces, but by rounded recesses. Such a bolt shank which is used only with relatively light loading, can readily be withdrawal from its seating if this appears to be necessary.

In FIGURE 11 is shown a pointed bolt shank 9 which is provided with the grooves 2' and indentations 3' in accordance with the invention. This bolt can readily be driven into and again withdrawn from masonry. This is also provided for light loads.

A bolt 1 is shown in FIGURE 12 in which the head and shank are constructed alike, that is to say, are formed about the radial middle plane as mirror-images of one another. This bolt serves the special purpose that when fitting, particular care need not be taken to see which is the head or shank, but it is merely driven in as it comes to hand. Such a bolt is then particularly favorable for use when a magazine is provided in which many bolts are contained which automatically advance to the insert position.

In FIGURES 13 to 15, bolts are illustrated in which the indentations 3' are arranged as annular grooves about the bolt shank 9 and in particular, in FIGURE 13 lie parallel but inclined to the bolt axis, in FIGURE 14 inclined alternately in two different directions and in FIGURE 15 in crossing grooves 3', A bolt shank 9 of the last mentioned type is particularly securely held in the material.

The indentations 3' on the bolt shank 9 according to FIGURE 16 are in a screw-thread form. If such a shank is pushed in by percussion and thereafter is then slightly rotated further, a relatively greater resistance exists against axially acting withdrawal forces.

FIGURES 17 to 20 show various forms of heads of bolts in accordance with the invention, wherein different types of indentations 3' are arranged on the shank 9. These types may find use for the securing of metal sheets, stiff interlayers or the like. The bolt according to FIGURE 19 has a screw thread at the upper portion of the shaft 9. Installation is performed by driving these bolts into the support up to the point of the threads and then these bolts are rotated into position by engagement of the slot 12.

The bolt according to FIGURE 20 has no pressed out head. At the upper end of the shaft 9, a thread 11 is formed which in the installed bolt projects beyond the work piece to be secured. By screwing a nut on to the thread 11, the member to be secured is held fast.

It can readily be seen that many variations are possible within the framework of the invention.

What we claim is:

1. A bolt comprising a shaft having opposite ends and including a conical masonry-piercing end portion at one of said ends adapted for being embedded in a support, a head on said shaft at the other end opposite said end portion for the securing of a member to the support, said shaft having parallel axial grooves extending the entire length thereof and indentations transverse thereto at least in the region of said ends, the grooves and indentations promoting penetration of the shaft into masonry while also resisting withdrawal of said shaft therefrom, said head having internal projections corresponding to the indentations on said shaft and longitudinal grooves, said projections in said head engaging in said indentations of the shaft when said head is fitted on said shaft to firmly hold said head on said shaft.

2. A bolt according to claim 1 wherein said indentations in said shaft have annular faces which intersect at an angle with respect to each other on said shaft.

3. A bolt according to claim 2 wherein said faces of said indentations intersect at an acute angle.

4. A bolt according to claim 2 wherein said faces of said indentations intersect at right angles, said faces of said indentations extending at an angle of 45° relative to the shaft.

5. A bolt according to claim 1 wherein said indentations on said shaft are shallow grooves and the corresponding projections in the interior of said head are flat elevations.

6. A bolt according to claim 1 wherein said shaft is mirror-inverted in relation to a radial plane through its center such that a head can be mounted on either end of the shaft.

7. A bolt according to claim 6 wherein said shaft has a second conical masonry-piercing portion at the opposite end thereof.

8. A bolt according to claim 1 wherein said shaft and said head consist of polymeric plastic material.

References Cited

UNITED STATES PATENTS

| | | | |
|---|---|---|---|
| 1,686,468 | 10/1928 | Rosenberg | 85—19 |
| 2,358,728 | 9/1944 | Miller | 85—21 |
| 2,954,717 | 10/1960 | Henning et al. | |
| 3,325,585 | 6/1967 | Brenneman | 85—14 |

FOREIGN PATENTS

| | | |
|---|---|---|
| 222,867 | 8/1962 | Austria. |
| 892,038 | 1/1944 | France. |

EDWARD C. ALLEN, Primary Examiner

U.S. Cl. X.R.

85—14, 19, 20, 21, 28